United States Patent [19]

Sakurai

[11] Patent Number: 4,733,540
[45] Date of Patent: Mar. 29, 1988

[54] CONTROL SYSTEM FOR VEHICULAR AIR CONDITIONING COMPRESSOR

[75] Inventor: Yukio Sakurai, Atsugi, Japan

[73] Assignee: Nissan Motor Co., Ltd., Japan

[21] Appl. No.: 940,496

[22] Filed: Dec. 10, 1986

[30] Foreign Application Priority Data

Dec. 11, 1985 [JP] Japan .................. 60-276943

[51] Int. Cl.⁴ .................. F25B 27/00; B60H 1/32
[52] U.S. Cl. .................. 62/133; 62/323.4; 62/231; 123/198 R
[58] Field of Search .............. 62/133, 230, 243, 244, 62/323.4, 323.1, 158, 231, 228.1, 239

[56] References Cited
U.S. PATENT DOCUMENTS 4,424,682 1/1984 Miska et al. .................. 62/133
4,480,443 11/1984 Nishi et al. .................. 62/231 X
4,610,146 9/1986 Tanemura .................. 62/133

OTHER PUBLICATIONS

Nissan Service Periodical Bulletin (published in Jun., 1983).

Primary Examiner—Harry B. Tanner
Attorney, Agent, or Firm—Leydig, Voit & Mayer

[57] ABSTRACT

A control system for controlling operation of a compressor of a vehicular air conditioning system. The control system comprises an electromagnetic clutch which is adapted to disengage so as to cut the drivable connection of the compressor with an engine. The electromagnetic clutch is in an electric circuit including a first switch adapted to close in the overheat condition of a fuel system, and a second switch adapted to close at an abrupt vehicle acceleration. Additionally, a timer is provided in the electric circuit to maintain the disengaged state of the electromagnetic clutch for a predetermined time upon close of both the first and second switches thereby to stop the operation of the compressor, thus improving vehicle acceleration performance under the fuel system overheat condition.

15 Claims, 3 Drawing Figures

CONTROL SYSTEM FOR VEHICULAR AIR CONDITIONING COMPRESSOR

BACKGROUND OF THE INVENTION

1. Field of the Invention

The present invention relates generally to an improvement in a control system for an air conditioning compressor of a vehicular air conditioning system, and more particularly to such a control system so configurated as to temporarily disconnect the compressor from an engine in order to improve acceleration performance of the vehicle.

2. Description of the Prior Art

In connection with automotive vehicles equipped with an air conditioning system in which an air conditioning compressor for refregerant is drivably connected to an engine, it has been already proposed and put into practical use to temporarily (for example, 3-10 seconds) disconnect the compressor from the engine when an operation for abrupt acceleration is made, i.e., an accelerator pedal is strongly depressed, so that load to the engine can be reduced during acceleration thereby to improve acceleration performance even a little. This is called an "acceleration cut system" which makes acceleration cut control for disconnecting the compressor from the engine.

In such an acceleration cut system, the rapid vehicle acceleration operation is usually detected, for example, by a pressure responsive switch adapted to be switched ON upon detection of a weakened intake manifold vacuum prevailing during abrupt vehicle acceleration, and an acceleration switch or a kickdown switch adapted to be switched ON when an accelerator pedal is abruptly depressed.

However, difficulties have encountered in automotive vehicles equipped with the above-mentioned acceleration cut system, in which the acceleration cut control is unavoidably frequently made and therefore the frequency of on-off action of the compressor becomes very high, so that the compressor frequently repeats its driven and stop actions. This hastens mechanical exhaustion of the compressor. In this regard, it is desirable to carry out the acceleration cut action of the compressor only when the acceleration cut is really necessary during acceleration. Accordingly, particularly in the automotive vehicles having a sufficient engine power output, frequent acceleration cut actions of the compressor make prominent disadvantage of such compressor mechanical exhaustion relative to advantage of acceleration performance improvement.

SUMMARY OF THE INVENTION

A control system for an air conditioning compressor of a vehicular air conditioning system comprises a device for stopping the operation of the air conditioning compressor for a predetermined time when a driving operation for abrupt vehicle acceleration has been made while a fuel system of the vehicle is in an overheat condition. Accordingly, the air conditioning compressor is not operated during vehicle acceleration in the fuel system overheat condition. This prevents vehicle acceleration performance from lowering under the fuel system overheat condition in which engine output power is lowered as compared under normal operating condition while raising engine trouble due to vapor lock and percolation in the fuel system.

BRIEF DESCRIPTION OF THE DRAWINGS

In the drawings, same reference numerals designate corresponding elements and parts throughout all figures, in which.

DETAILED DESCRIPTION OF THE INVENTION

Figure 1:
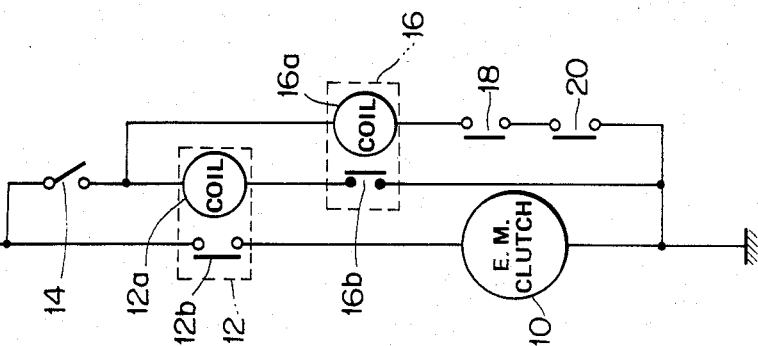
FIG. 1 is a circuit diagram of a first embodiment of a control system for an air conditioning compressor of a vehicular air conditioning system, in accordance with the present invention.

Referring now to FIG. 1, there is shown a first embodiment of a control system for controlling operation of an air conditioning compressor of an air conditioning system, in accordance with the present invention. In this embodiment, the air conditioning system is for an automotive vehicle. The control system comprises an electromagnetic clutch 10 through which a compressor (not shown) is mechanically or drivably connectable with an engine, so that the compressor can be driven to operate or rotate by the engine when the electromagnetic clutch is engaged upon being supplied with electric current. Accordingly, the compressor is mechanically released from the engine to be stopped when the electromagnetic clutch 10 is disengaged upon being not supplied with electric current.

The electromagnetic clutch 10 is electrically connected in series with a normally opened contact 12b of an air conditioning relay 12 and an electric power source. The air conditioning relay 12 has an electromagnetic coil 12a which is electrically connected in series with an air conditioning switch 14 forming part of the air conditioning system and with a normally closed contact 16b of a timer 16. When the air conditioning switch 14 is turned ON, electric current flows through the switch 14, the relay coil 12a and the timer normally closed contact 16b, so that the relay 12 is operated to close the normally opened contact 12b thereby to cause electric current to pass through the electromagnetic clutch 10. Accordingly, the electromagnetic clutch 10 is engaged so that the compressor is brought into mechanical connection with the engine to be driven to rotate or operate.

The timer 16 is for disconnection between the compressor and the engine and adapted to cause the normally closed contact 16b to be turned OFF for a predetermined time ranging from about 3 to 10 seconds when the timer 16 operates or works in a state where the electromagnetic clutch 10 is supplied with electric current. Consequently, the relay normally opened contact 12b is also turned OFF for the predetermined time, so that the compressor is temporarily disconnected from the engine to stop for the predetermined time.

The timer 16 has a coil 16a which is electrically connected in series with the air conditioning switch 14, a pressure switch 18 and a temperature switch 20. When electric current passes through this series circuit, the timer coil 16a is energized to cause the normally closed contact 16b to be turned OFF (opened) while starting measurement of the predetermined time, so that the contact 16b continues to be turned OFF for the predetermined time. The pressure responsive switch 18 serves as means for detecting operation for abrupt vehicle acceleration and is adapted to be turned ON when vacuum in an intake manifold of the engine is lowered or weakened below a predetermined level upon an accelerator pedal being depressed. A temperature switch 20 serves as means for detecting overheat condition of a fuel system for the engine and accordingly is disposed in the vicinity of the fuel system within an engine compartment of the vehicle. The temperature switch 20 is adapted to be turned ON when the detected temperature exceeds a predetermined level above which overheat of the fuel system occurs.

With the thus arranged air conditioning compressor control system, when a driving operation for abrupt vehicle acceleration is made by an operator or driver in a state where the fuel system is overheated, the temperature responsive switch 20 is turned ON and the pressure responsive switch 18 is also turned ON. Consequently, the timer 16 operates or works to turn the normally closed contact 16b OFF (opened) for the predetermined time so that the relay coil 12a is deenergized thereby to turn the contact 12b OFF (opened). As a result, supply of electric current to the electromagnetic clutch 10 is stopped and accordingly the electromagnetic clutch 10 is disengaged for the predetermined time thus accomplishing the disconnection between the compressor and the engine.

Now, in case where the vehicle cruises a traffic congested urban area or ascends a slope in hot climate, the temperature within the engine compartment becomes high so that the fuel system is heated. When the vehicle is stopped under such a condition, cooling by a radiator becomes ineffective and therefore the fuel system is overheated. This causes vapor lock and percolation in the fuel system, thereby lowering engine power output and leading to engine stall sometimes.

In view of the above, according to the first embodiment compressor control system, the temperature responsive switch 20 detects the overheat condition of the fuel system causing engine power output lowering. When the driving operation for the abrupt vehicle acceleration is made under the thus detected fuel system overheat condition, the compressor is disconnected from the engine to be stopped. However, during normal operation where the fuel system is not overheated, the compressor is not disconnected from the engine and therefore continues to operate or rotate thereby to maintain air conditioning operation of the air conditioning system.

Thus, the first embodiment compressor control system is much less in frequency of driving and stopping controls of the compressor than a conventional corresponding system in which the stopping control of an air conditioning compressor is carried out at every vehicle acceleration operation. This prevents the compressor from its unnecessary and excessive exhaustion. Additionally, compressor operation stopping is carried out only when it is really necessary and effective, thereby improving vehicle acceleration performance in the fuel system overheat condition.

Figure 2:
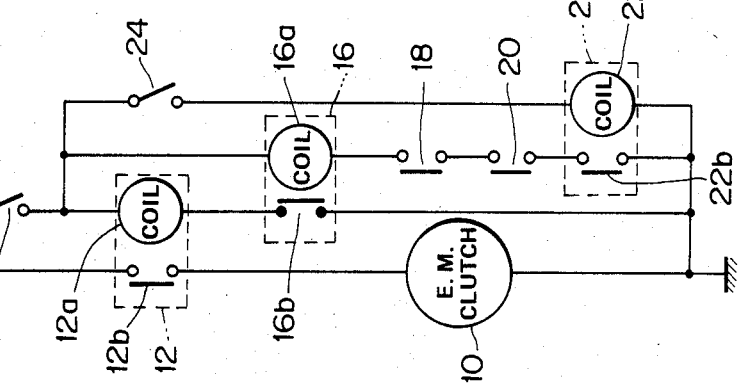
FIG. 2 is a circuit diagram similar to FIG. 1 but showing a second embodiment of the control system according to the present invention.

FIG. 2 illustrates a second embodiment of the air conditioning compressor control system according to the present invention, which is similar to the first embodiment of FIG. 1 with the exception that the disconnection between the compressor and the engine is carried out within 5 minutes after engine starting. In other words, the compressor control system of this embodiment is arranged to carry out the disconnection between the compressor and the engine within 5 minutes after engine starting in view of the fact that vapor lock and percolation in the fuel system tends to occur at hot restart of the engine.

In this embodiment, a timer 22 is provided to measure 5 minutes and has a coil 22a electrically connected in series with an ignition switch 24, the air conditioning switch 14 and the power source. The timer 22 has a normally opened contact 22b which is inserted in series to the series circuit of the pressure switch 18 and the temperature switch 20. With this arrangement, the timer normally opened contact 22b is turned ON only for 5 minutes after the ignition switch 24 is turned ON to start the engine, in which the coil 22a is energized to turn the contact 22b ON while a time measurement of 5 minutes is made upon the ignition switch 24 being turned ON. When both the temperature switch 20 and the pressure switch 18 are turned ON under the above-mentioned condition where the timer normally closed contact 22b is turned ON, the disconnection between the compressor and the engine is carried out to stop the operation of the compressor.

Figure 3:
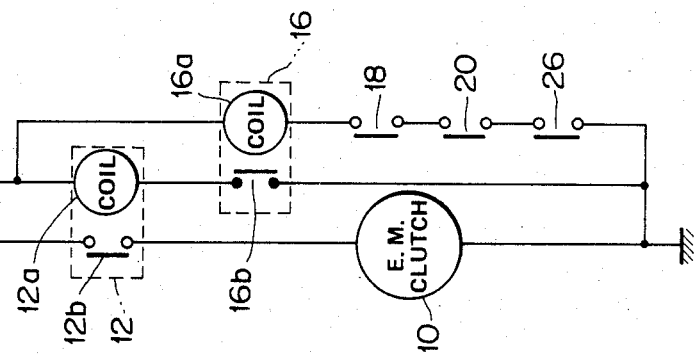
FIG. 3 is a circuit diagram of a third embodiment of the control system according to the present invention.

FIG. 3 illustrates a third embodiment of the compressor control system according to the present invention, which is similar to the first embodiment of FIG. 1 with the exception that the disconnection between the compressor is carried out under an additional condition that outside air temperature is higher than a predetermined temperature (for example, about 40° C.).

Accordingly, in this embodiment, a temperature responsive switch 26 is provided to detect outside air temperature (temperature of air outside the vehicle) and inserted in series to the series circuit of the pressure responsive switch 18 and the temperature responsive switch 20. The temperature switch 26 is adapted to be turned ON when the outside air temperature exceeds the predetermined temperature (about 40° C.). With this arrangement, when all the three switches 18, 20, 26 are turned ON, the disconnection between the compressor and the engine is carried out to stop the operation of the compressor.

It will be understood that, under a very high outside air temperature condition, thermal load of the air conditioning system is high and accordingly rotational load to the compressor is high. The disconnection of the compressor from the engine under such a condition considerably reduces load to the engine thereby offering an advantage of considerable acceleration performance improvement.

While the compressor control has been shown and described as being made also in response to the outside air temperature in the third embodiment, it will be appreciated that such compressor control may be made in response to difference between the outside air temperature and inside air temperature (temperature of air inside the vehicle) which difference represents thermal load to the air conditioning system, in which the disconnection of the compressor from the engine is carried out when both the pressure switch 18 and the temperature switch 20 are turned ON under the condition where the above-mentioned difference exceeds a predetermined value.

What is claimed is:
1. A control system for an air conditioning compressor of an air conditioning system for a vehicle, said control system comprising:
   first means for detecting overheat condition of a fuel system of the vehicle;

second means for detecting abrupt vehicle acceleration including
a pressure responsive switch adapted to close in response to an intake manifold vacuum of the engine being below a predetermined level; and
means for stopping operation of said air conditioning compressor for a first predtermined time upon detection of both said overheat condition and said abrupt vehicle acceleration.

2. A control system as claimed in claim 1, further comprising means for allowing said air conditioning compressor operation stopping means to operate only for a second predetermined time after starting of an engine of the vehicle, when operated.

3. A control system as claimed in claim 1, further comprising means for allowing said air conditioning compressor operation stopping means to operate in response to outside air temperature.

4. A control system as claimed in claim 1 wherein said air conditioning compressor operation stopping means includes:
means for disconnecting the compressor from the engine to stop the operation of the compressor;
means for actuating said disconnecting means; and
means for actuating said disconnecting means actuating means for said first predetermined time upon operation of both said first detecting means and said second detecting means.

5. A control system as claimed in claim 4 wherein overheat condition detecting means includes:
a first temperature responsive switch which is adapted to close in response to a temperature of the fuel system being above a predetermined level.

6. A control system as claimed in claim 5 wherein said means for actuating said disconnecting means actuating means for said predetermined time includes:
a first timer having a coil electrically connected in series with said pressure and temperature responsive switches and adapted to be energized when both said pressure and temperature responsive switches close; and
a contact adapted to open when said first timer coil is energized.

7. A control system as claimed in claim 6 wherein said disconnected means actuating means includes:
a relay having a coil which is electrically connected in series with said first timer contact and adapted to be deenergized when said timer contact opens; and
a contact adapted to open when said relay coil is deenergized.

8. A control system as claimed in claim 7 wherein said disconnecting means includes:
an electromagnetic clutch electrically connected in series with said relay contact and adapted to be disengaged to disconnect the compressor and the engine when said relay contact opens.

9. A control system as claimed in claim 2 wherein said means for allowing said air conditioning compressor operation stopping means to operate only for said second predetermined time includes:
a second timer adapted to operate only for said predetermined time after an ignition switch for an engine of the vehicle is turned ON, the operation of the air conditioning compressor being capable of stopping during operation of said second timer.

10. A control system as claimed in claim 8 further comprising:
a second timer having a coil electrically connected in series with an ignition coil of the engine and adapted to be energized when the ignition switch is turned ON; and
a contact electrically connected in series with said pressure and temperature responsive switches and adapted to close only for said second predetermined time after turning-ON of the ignition switch.

11. A control system as claimed in claim 3 wherein said means for allowing said air conditioning compressor operation stopping means to operate includes temperature responsive means arranged to allow the air conditioning compressor operation stopping means to operate in response to the outside air temperature being above a predetermined level.

12. A control system as claimed in claim 8 further comprising:
temperature responsive means for allowing the air conditioning compressor operation stopping means to operate in response to the outside air temperature being above a predetermined level, said temperature responsive means including a second temperature responsive switch electrically connected in series with said pressure and temperature responsive switches and adapted to close in response to the outside temperature being above said predetermined level.

13. A control system as claimed in claim 1, wherein said first predetermined time is within a range of from 3 to 10 seconds.

14. A control system as claimed in claim 2, wherein said second predetermined time is about 5 minutes.

15. A control system as claimed in claim 11, wherein said predetermined level in the outside air temperature is about 40° C.

* * * * *